United States Patent [19]

Nakamura

[11] Patent Number: 4,862,348
[45] Date of Patent: Aug. 29, 1989

[54] MICROCOMPUTER HAVING HIGH-SPEED AND LOW-SPEED OPERATION MODES FOR READING A MEMORY

[75] Inventor: Michiya Nakamura, Tokyo, Japan
[73] Assignee: NEC Corporation, Tokyo, Japan
[21] Appl. No.: 4,927
[22] Filed: Jan. 20, 1987
[30] Foreign Application Priority Data
Jan. 20, 1986 [JP] Japan .................................. 61-10419
[51] Int. Cl.⁴ ...................... G06F 13/00; G06F 15/00
[52] U.S. Cl. ................................................. 364/200
[58] Field of Search ... 364/200 MS File, 900 MS File; 365/189, 190

[56] References Cited
U.S. PATENT DOCUMENTS

| 4,470,109 | 9/1984 | McNally | 364/200 |
| 4,508,101 | 4/1985 | Suzuki | 84/1.01 |
| 4,594,657 | 6/1986 | Byrns | 364/200 |
| 4,594,690 | 6/1986 | Meyers et al. | 365/189 |
| 4,660,180 | 4/1987 | Tanimura et al. | 365/189 |
| 4,715,017 | 12/1987 | Iwahashi | 365/189 |
| 4,727,491 | 2/1988 | Culley | 364/200 |

Primary Examiner—Archie E. Williams, Jr.
Assistant Examiner—Ayni Mohamed
Attorney, Agent, or Firm—Sughrue, Mion, Zinn, Macpeak & Seas

[57] ABSTRACT

A microcomputer having an instruction memory is provided with a high-speed sense amplifier which can selectively operate in either of a high-speed operation mode or a low-speed operation mode. The high-speed sense amplifier is activated full time or at a large duty rate in the high-speed operation mode and is activated at a low-duty rate in the low-speed operation mode. By operating at a low-duty rate in the low-speed mode, a considerable power savings is realized while retaining the high speed benefits of the sense amplifier, which may be in the form of a current mirror-type sense amplifier or the like.

2 Claims, 6 Drawing Sheets

MICROCOMPUTER HAVING HIGH-SPEED AND LOW-SPEED OPERATION MODES FOR READING A MEMORY

BACKGROUND OF THE INVENTION

The present invention relates to a microcomputer having a high-speed operation mode and a low-speed operation mode, and particularly to a microcomputer having a high-speed sense amplifier for reading instructions out of an instruction memory.

In general, a high frequency oscillator is used to apply a high frequency clock to a microcomputer in the high-speed operation mode, while a low frequency oscillator is used in the low-speed operation mode. In order to increase the operating speed of a microcomputer, both the instruction execution speed and the instruction reading speed must be increased. To increase the instruction reading speed, a high-speed sense amplifier, such as a current mirro type sense amplifier, will be required as a memory reading circuit. Since a sense amplifier of this type requires a large drive current, a large amount of power is consumed.

In the high-speed operation mode, the instruction reading cycle becomes short because the instruction execution speed is increased and because the high frequency clock is used. However, the instruction reading period can not be shortened to less than a period determined by the characteristics of the sense amplifier and the memory, to insure that an instruction fetch into the central processing unit (CPU) can be carried out. Thus, it will be required in the high-speed operation mode to use a sense amplifier which is activated either full time or with a large duty rate.

On the other hand, when the low frequency oscillator is connected to the microcomputer in the low-speed operation mode, low power consumption is required. In this case, a low frequency clock is applied to the microcomputer. However, a large amount of power is still consumed b the above mentioned sense amplifier because it is actvated at the same duty rate as that in the high-speed opration mode. To avoid power consumption by this sense amplifier, a low-power sense amplifier is required. However, since a microcomputer having such a low-power sense amplifier has not been developed, a long development term and design change are necessary.

SUMMARY OF THE INVENTION

It is an object of the present invention to provide a microcomputer having both a high-speed operation mode and a low-speed operation mode yet enjoying low power consumption.

It is another object of the present invention to provide a microcomputer having a high-speed sense amplifier which can be activated low power in a low-speed operation mode.

The microcomputer of the present invention has a sense amplifier and a circuit coupled to the sense amplifier to generate an enable signal to activate the sense amplifier and to apply the enable signal to the sense amplifier. The circuit generates a first enable signal which activates the sense amplifier either full time or with a large duty rate during a high-speed operation mode, and generates a second enable signal with a lower duty rate during a low-speed operation mode.

The first and second enable signals are selectively generated according to a mode designating signal.

DESCRIPTION OF THE PREFERRED EMBODIMENTS

A detailed description of the present invention will be given with reference to the accompanying drawings.

Figure 1:
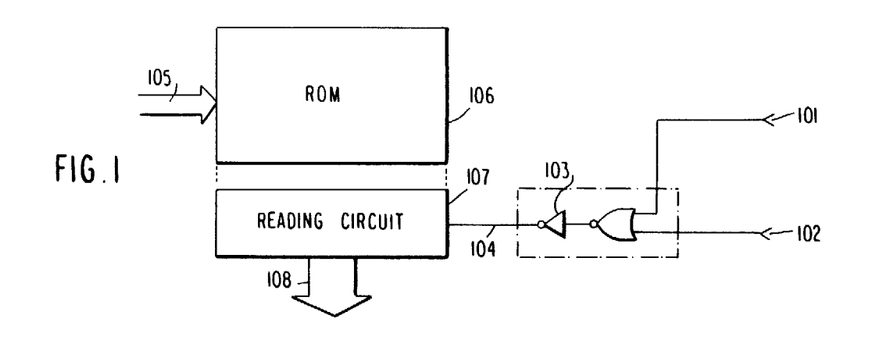
FIG. 1 illustrates a block diagram of one embodiment of the present invention.

FIG. 1 illustrates a block diagram of a memory 106 and a reading circuit 107 in a microcomputer. Each instruction cycle of the microcomputer consists of $\phi 1$, $\phi 2$, $\phi 3$ and $\phi 4$ states. An instruction in a read only memory (ROM) 106 is read out in the $\phi 4$ state of a first instruction cycle and the $\phi 1$ state of a succeeding instruction cycle and is executed in the $\phi 2$ to $\phi 4$ states of this instruction cycle. The reading circuit has a high-speed sense amplifier 107. An enable signal 104 is used in the present invention to activate the sense amplifier 107. The enable signal 104 is generated from an enable signal generating circuit 103 which receives a mode designating signal 101 and a reading control signal 102. The mode designating signal becomes "H" in the high-speed operation mode and becomes "L" under a low-speed operation mode. The reading control signal 102 becomes "H" in the $\phi 4$ and $\phi 1$ states and becomes "L" in the $\phi 2$ and $\phi 3$ states. Each of the states $\phi 1$ to $\phi 4$ is determined by one cycle of a clock applied to the microcomputer.

Figure 2:
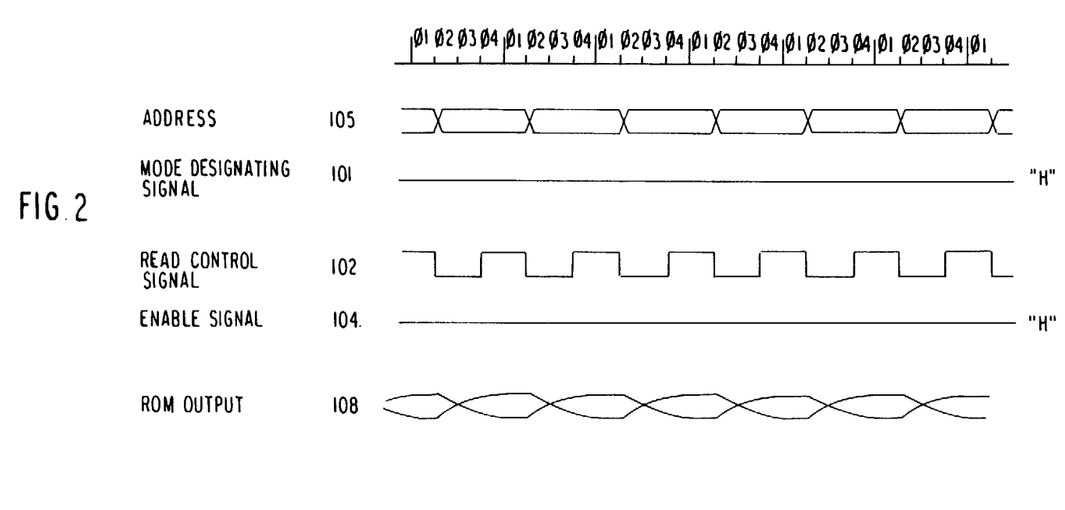
FIG. 2 illustrates a timing chart of operations of the drive of FIG. 1 in a high-speed operation mode.

In the high-speed operation mode shown in FIG. 2, the mode designating signal 101 is at "H". An address 105 is applied to the ROM 106 from the $\phi 2$ state in a first cycle until the $\phi 1$ state in a succeeding cycle according to the instruction prefetch architecture. In this mode the enable signal 104 is always at "H" regardless of the reading control signal 102. Consequently, the sense amplifier 107 is always activated, so that an instruction 108 designated by the corresponding address 105 is read out of the ROM 106 via the sense amplifier 107. Since the enable signal 104 is fixed at "H" during the high-speed operation mode, each of the instructions corresponding to the address is sequentially read out of the ROM 106 and is sent to an instruction decoder in a CPU (not shown).

Figure 3:
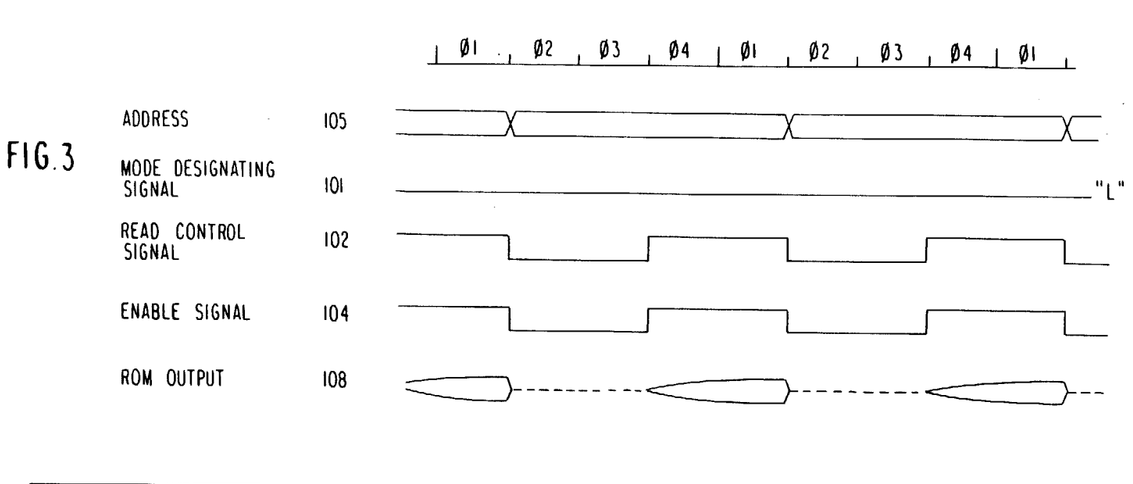
FIG. 3 illustrates a timing chart of operations of the drive of FIG. 1 in a low-speed operation mode.

On the other hand, in the low-speed operation mode, a low-frequency clock is applied to the microcomputer, and therefore the period of each state is enlarged as shown in FIG. 3. In this mode, the mode designating signal 101 becomes "L", so that the reading control signal 102 is applied to the sense amplifier 107 as the enable signal 104. Consequently, the sense amplifier 107 is activated only in the $\phi 4$ and $\phi 1$ states through the address 105 applied to the ROM in the $\phi 2$ to $\phi 1$ states. Since the high-speed sense amplifier 107 is used, an instruction is surely read out of the ROM 106 within the activation time ($\phi 4$ and $\phi 1$). According to this embodiment, power consumption of the sense amplifier 107 can be avoided in the $\phi 2$ and $\phi 3$ states of each cycle in the low-speed operation mode.

Figure 4:
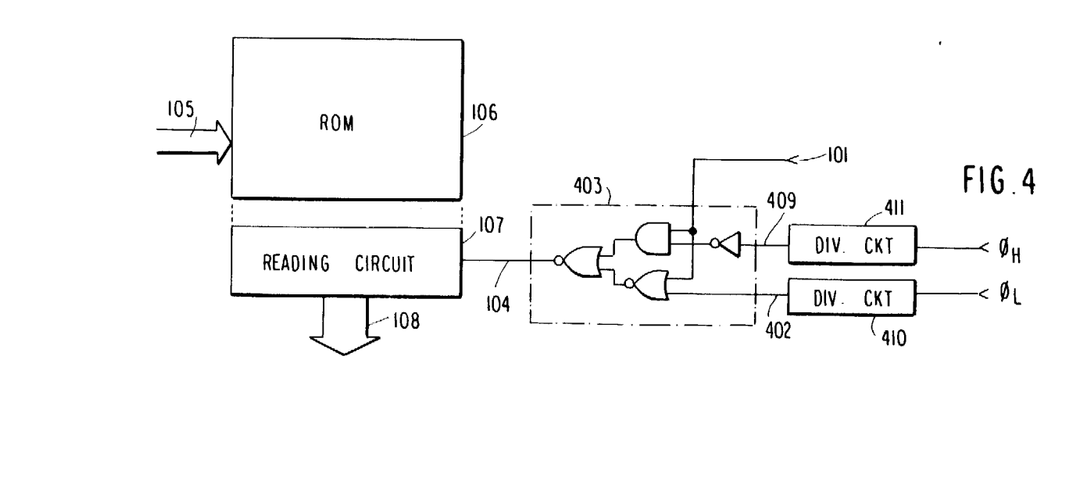
FIG. 4 illustrates a block diagram of another embodiment of the present invention.

FIG. 4 is a block diagram of another embodiment of the present invention. In this embodiment, two divider circuits 410 and 411 are provided and have different dividing ratios. The divider circuit 410 receives a low-frequency clock $\phi L$ and applies a divided clock 402 to a enable signal generating circuit 403. The divider circuit 411 receives a high-frequency clock $\phi H$ and applies a divided clock 409 to the generating circuit 403. The mode designating signal 101 selects one of the divided clocks 402 and 409. When the mode designating signal 101 is "H", the divided clock 409 is selected and is applied to the sense amplifier 107 as the enable signal 104. On the other hand, when the mode designating signal 101 is "L", the divided clock 402 is applied to the sense amplifier 107 as the enable signal 104.

According to this embodiment, the high-frequency clock $\phi H$ is divided into the clock 409 with a large duty rate, while the low-frequency clock $\phi L$ is divided into the clock 402 with a short duty rate. Therefore, the sense amplifier 107 is activated at the large duty rate in the high-speed operation mode and is activated at the short duty rate in the low-speed operation mode.

Figure 5:
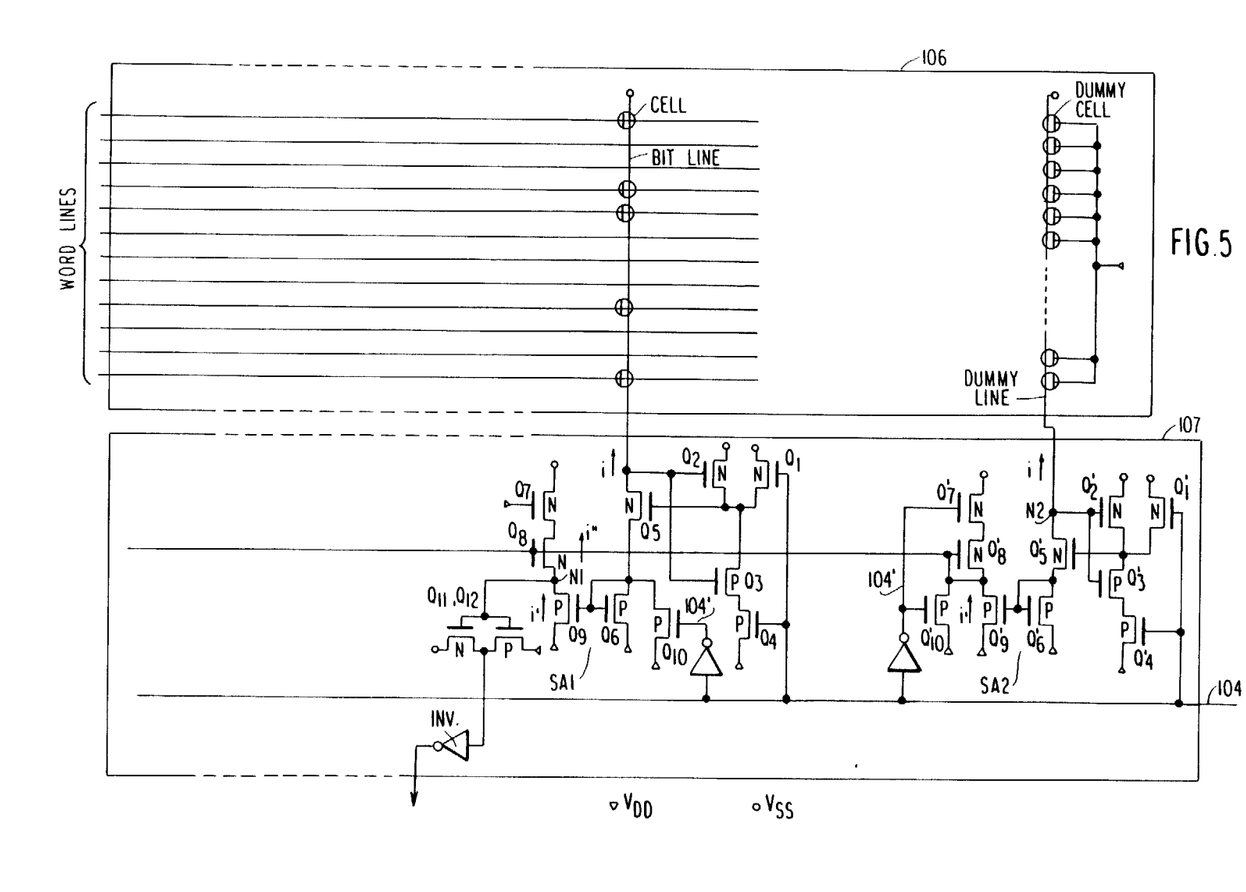
FIG. 5 illustrates a circuit diagram of a sense amplifier used in the present invention.

FIG. 5 is a circuit diagram of the ROM 106 and the sense amplifier 107 according to the preferred embodiment of the present invention. It should be noted that only one bit line and the corresponding sense amplifier is illustrated. A bit line of the ROM 106 contains cells programmed according to an instruction code. Each cell is turned on by the corresponding word signal. The ROM 106 further contains a dummy line having dummy cells equal to the word signals in number. The dummy cells are always turned on by $V_{DD}$ voltage. The sense amplifier 107 has current mirror type sense amplifiers SA1 connected to the bit line and SA2 connected to the dummy line. These sense amplifiers SA1 and SA2 consist of a complementally MOS circuit with a P channel MOS FET (P-FET) and an N channel MOS FET (N-FET). The sense amplifier SA1 have five N-FETs $Q_1$, $Q_2$, $Q_5$, $Q_7$ and $Q_8$ and five P-FETs $Q_3$, $Q_4$, $Q_6$, $Q_9$ and $Q_{10}$. The sense amplifier SA2 has five N-FETs $Q'_1$, $Q'_2$, $Q'_5$, $Q'_7$ and $Q'_8$ and five P-FETs $Q'_3$, $Q'_4$, $Q'_6$, $Q'_9$ and $Q'_{10}$. The enable signal 104 is applied to gates of $Q_1$, $Q'_1$, $Q_4$ and $Q'_4$. The inverted enable signal 104' is applied to gates of $Q'_7$, $Q_{10}$ and $Q'_{10}$. $Q_1$, $Q'_1$, $Q_4$, $Q'_4$, $Q_{10}$, $Q'_{10}$ and $Q'_7$ are provided to activate the sense amplifiers SA1 and SA2 using the enable signal 104. In this embodiment, the sense amplifier SA2 is used as a reference voltage generating circuit, and the dummy line and dummy cells are used as a dummy current source.

Since a source of N-FET $Q'_5$ and a gate of N-FET $Q'_2$ are connected to an output of the dummy line, the N-FET $Q'_2$ acts as an inverter. As a result, the potential at node $N_2$ is equal to the threshold voltage of the N-FET $Q'_2$, so that a current i flows to the dummy line. In this state the same current i flows to the P-FET $Q'_6$. Since the P-FET $Q'_6$ and P-FET $Q'_9$ form a current mirror circuit, a current i' (i' =gm of $Q'_9$/gm of $Q'_6 \times$i) is flows to the P-FET $Q'_9$ and further flows to the N-FETs $Q'_8$ and $Q'_7$. Further, since the N-FET $Q_8$ whose gate is applied to the output of circuit SA2 andthe N-FET $Q'_8$ form a current mirror circuit, a current i" (i" =gm of $Q_8$/gm of $Q'_8 \times$i') flows to the N-FET $Q_8$.

At this time, when all cells of the bit line are turned on, the current i flows to the bit line. It should be noted that the gm of $Q_6$ is equal to that of $Q'_6$ and that the gm of $Q_9$ is equal to that of $Q'_9$. As a result, the current i' flows to the P-FET $Q_9$, and therefore the voltage at node N1 becomes "H". Since the node N1 is connected to a gate of a C MOS inverter circuit $Q_{11}$, $Q_{12}$, the N-FET $Q_{11}$ is turned on. Thus, an output "H" is derived from the ROM 106.

On the other hand, if at least one of the cells on the bit line is turned off, the current i does not flow to the N-FET $Q_5$, and therefore the P-FET $Q_6$ is turned off. Consequently, the node N1 becomes "L" ($V_{SS}$), and the P-FET $Q_{12}$ is turned on. Thus, an output "L" is derived from the ROM 106.

As described above, the current mirror type sense amplifier requires no precharge time, so that it can drive an ROM output (instruction) at high speed. However, a large amount of current is required. In the present invention, the enable signal 104 is used to reduce the power consumption of the sense amplifier.

Figure 6:
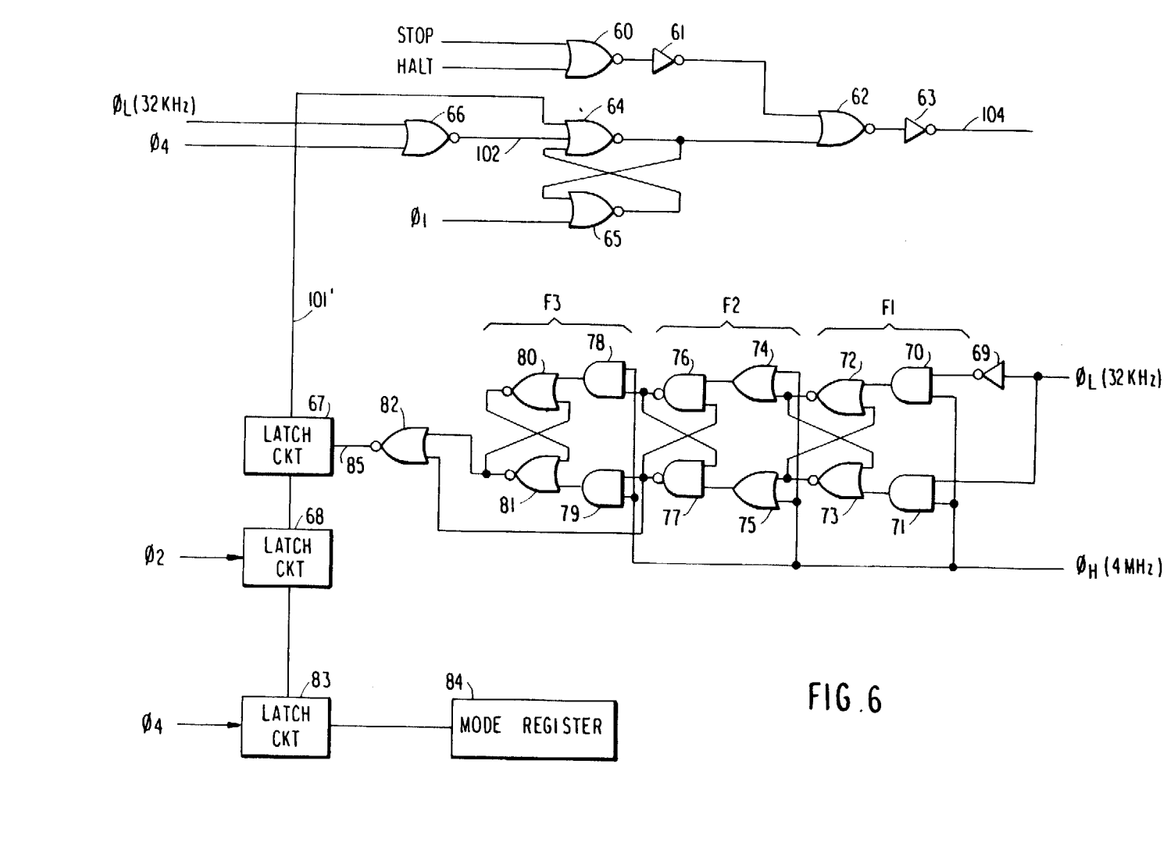
FIG. 6 illustrates a circuit diagram of an enable signal generating circuit used in the present invention.

The enable signal 104 is generated by a generating circuit shown in FIG. 6. In this embodiment, "H" is set in a mode register 84 in the high-speed operation mode, while "L" is set therein in the low-speed operation mode. The mode designating signal 101 is outputted from the mode register 84 and is transferred to an NOR gate 64 via three latch circuits 83, 68 and 67. These latch circuits are provided to control signal application timing to the NOR gate 64. That is, the mode designating signal 101 is latched into the first latch circuit 83 in the $\phi 4$ state which is assigned to the write operation of the mode designating signal 101 and is latched into the second latch circuit 68 in the $\phi 2$ state. This latch circuit 68 is used to protect against noise which arrives in the write operation. Thereafter the mode designating signal 101 is latched into the third latch circuit 67 which controls the timing when the low-frequency clock $\phi L$ is changed to the high-frequency clock $\phi H$, and vice versa. The timing is determined by three cascaded flip-flops F1 to F3. First and third flip-flops F1 and F2 consist of two AND gates (70, 71, and 78, 79) and two NOR gates (72, 73 and 80, 81), respectively. The second flip-flop F2 consists of two OR gates 74, 75 and two NAND gates 76 and 77. When the low-frequency oscillator is connected to the microcomputer, the low-frequency clock $\phi L$ (32 KHz) is applied to the AND gate 71 and the clock as inverted by an inverter 69 is applied to the AND gate 70. The high-frequency clock $\phi H$ (4 MHz) is applied to the AND gates 70, 71, 78, 79 and the OR gates 74, 75 in common, when the high-frequency oscillator is connected to the microcomputer. Thus, the timing signal 85 is synchronized with the falling edge of each clock and is applied to the third latch circuit 67 via NOR gate 82. The mode designating signal 101' is applied to the NOR gate 64 in synchronism with the timing signal 85. The NOR gate 64 and NOR gate 65 are connected with each other in a flip-flop manner. This flip-flop is set by either the mode designating signal 101' or an output of NOR gate 66. The NOR gate 66 receives the low-frequency clock $\phi L$ (32 kHz) and a $\bar{\phi}4$ signal and generates the read control signal 102 which is activated from the falling edge of the $\phi L$ clock in the $\phi 4$ state until the rising edge of the $\phi 1$ signal.

In the high-speed operation mode, the mode designating signal 101' is "H", and therefore the flip-flop is set regardless of the read control signal 102 and outputs an "L" signal to NOR gate 62. If a stop signal (STOP) and a halt signal (HALT) which are generated when the operations of the microcomputer should be stopped are not present, the enable signal 104 becomes "L" (active level) because the output "H" of the NOR gate 62 is inverted by an inverter 63. In response to the enable signal 104, the P-FETs $Q_4$ and $Q'_4$ are turned on, so that both the N-FETs $Q_5$ and $Q'_5$ are turned on to couple the bit line and the dummy line to the sense amplifiers SA1 and SA2, respectively. Thus, the sense amplifier 107 is always activated in the high-speed operation mode as shown in FIG. 7.

On the other hand, when the low-speed operation mode is required, the mode designating signal 101' becomes "L". As a result, the flip-flop (64 and 65) is set only when $\phi L$ and $\overline{\phi 4}$ are both "L" and is reset by the $\phi 1$ signal shown in FIG. 8. Therefore, the sense amplifier 107 is activated only when $\phi L$ and $\overline{\phi 4}$ are both "L". In the remaining period, the enable signal 104 becomes "H", and therefore, the N-FETs $Q_1$ and $Q'_1$ are turned on while the P-FETs $Q_4$ and $Q'_4$ are turned off. Thus, the N-FETs $Q_5$ and $Q'_5$ are both turned off. Consequently, the P-FETs $Q_6$ and $Q'_6$ are decoupled from the bit line and the dummy line, respectively. In this period, no power is consumed because the current path is cut off.

Figure 7:
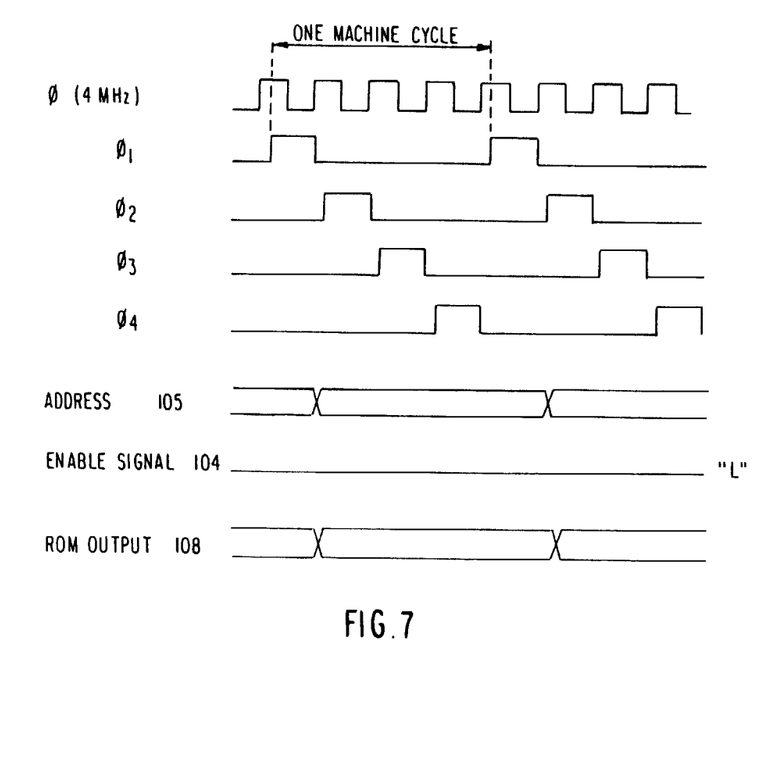
FIG. 7 illustrates a timing chart of the sense amplifier shown in FIG. 5 in a high-speed operation mode.
Figure 8:
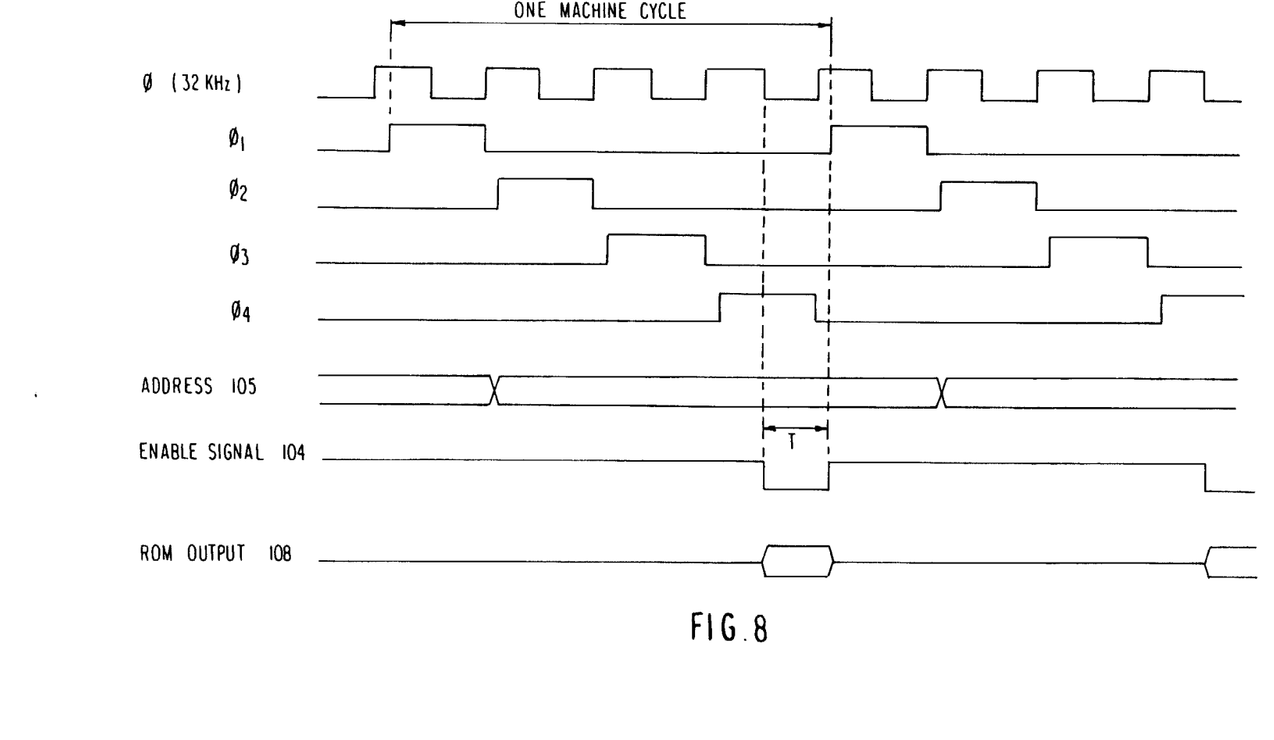
FIG. 8 illustrates a timing chart of the sense amplifier shown in FIG. 5 in a low-speed operation mode.

In FIGS. 7 and 8, each of the state signals $\phi 1$ to $\phi 4$ is produced on the basis of the clock and is used to control the timing of one machine (instruction) cycle. In the low-speed operation of this embodiment, an instruction is read out of the ROM in a period T and is fetched into the CPU the $\phi 1$ state. The CPU executes the fetched instruction in the $\phi 2$ to $\phi 4$ states. Further, in the $\phi 4$ state, the next instruction is read out of the ROM according to the instruction prefetch architecture.

Turning to FIG. 6, when either the stop signal or the halt signal becomes "H", the enable signal 104 becomes "H", and therefore, the sense amplifier 107 is inactivated.

What is claimed is:

1. A microcomputer having a high-speed operation mode and a low-speed operation mode, comprising; a memory storing information used in said microcomputer, a reading circuit coupled to said memory for reading said information out of said memory, said reading circuit having an enable terminal and being activated by an operation-enable signal applied to said enable terminal, and a control circuit including means for producing a mode designating signal having a first level when said high-speed operation mode is designated and a second level when said low-speed operation mode is designated, means for intermittently producing a read control signal, means responsive to said first level mode designating signal for generating a first enable signal during the entire time period of said high-speed operation mode irrespective of said read control signal and for applying said first enable signal to said enable terminal of said reading circuit as said operation-enable signal, and means responsive to said second level mode designating signal and said read control signal for intermittently generating a second enable signal and for applying said second enable signal to said enable terminal of said reading circuit as said operation-enable signal, whereby said reading circuit is continuously activated during said high-speed operation mode by said first enable signal and is activated intermittently in said low-speed operation mode by said second enable signal.

2. A microcomputer as claimed in claim 1, wherein said reading circuit comprises a current mirror type sense amplifier which includes a switching circuit for coupling a bit line of said memory to a current mirror circuit of said reading circuit, said switching circuit being continuously turned on during said high-speed operation mode by said first enable signal and being intermittently turned on in the low-speed operation mode by said second enable signal.

* * * * *

UNITED STATES PATENT AND TRADEMARK OFFICE
CERTIFICATE OF CORRECTION

PATENT NO. : 4,862,348

DATED : August 29, 1989

INVENTOR(S) : NAKAMURA

It is certified that error appears in the above-identified patent and that said Letters Patent is hereby corrected as shown below:

Col. 1, line 21, delete "mirro" insert --mirror--.

Col. 1, line 41, delete "b" insert --by--.

Col. 3, line 68, delete "andthe" insert --and the--.

Signed and Sealed this

Twenty-fifth Day of December, 1990

Attest:

HARRY F. MANBECK, JR.

*Attesting Officer*   *Commissioner of Patents and Trademarks*